(12) United States Patent
Desjardins

(10) Patent No.: US 11,326,523 B2
(45) Date of Patent: May 10, 2022

(54) GAS TURBINE ENGINE WITH ACCESSORY GEARBOX

(71) Applicant: PRATT & WHITNEY CANADA CORP., Longueuil (CA)

(72) Inventor: Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/175,924

(22) Filed: Feb. 15, 2021

(65) Prior Publication Data
US 2021/0164400 A1     Jun. 3, 2021

Related U.S. Application Data

(63) Continuation of application No. 16/278,858, filed on Feb. 19, 2019, now Pat. No. 10,995,675.

(51) Int. Cl.
*F02C 7/32*     (2006.01)

(52) U.S. Cl.
CPC ............ *F02C 7/32* (2013.01); *F05D 2220/32* (2013.01); *F05D 2240/60* (2013.01); *F05D 2250/30* (2013.01)

(58) Field of Classification Search
CPC .................................................. F05D 2250/30
See application file for complete search history.

(56) References Cited

U.S. PATENT DOCUMENTS

| | | | |
|---|---|---|---|
| 4,640,153 A | 2/1987 | Brogdon et al. | |
| 4,828,422 A * | 5/1989 | Anthony | B25B 27/062 403/24 |
| 7,728,447 B2 | 6/2010 | Becquerelle et al. | |
| 8,074,455 B2 | 12/2011 | Pierrot et al. | |
| 8,347,637 B2 | 1/2013 | Suciu et al. | |
| 8,814,502 B2 | 8/2014 | Eleftheriou | |
| 8,857,192 B2 | 10/2014 | Huang et al. | |
| 8,973,465 B2 | 3/2015 | Duong | |
| 9,217,374 B2 | 12/2015 | Beier | |
| 9,482,265 B2 | 11/2016 | Campbell et al. | |
| 9,829,087 B2 | 11/2017 | Beier | |
| 9,845,735 B2 | 12/2017 | Duong et al. | |

(Continued)

FOREIGN PATENT DOCUMENTS

| | | |
|---|---|---|
| CN | 106460668 | 5/2018 |
| CN | 110043371 | 7/2019 |

(Continued)

OTHER PUBLICATIONS

Extended European Search Report, EP20158364.8, dated Jul. 13, 2020.

*Primary Examiner* — Vicky A Johnson
(74) *Attorney, Agent, or Firm* — Norton Rose Fulbright Canada LLP

(57) ABSTRACT

A gas turbine engine with an accessory gearbox. The accessory gearbox has a gear shaft rotatable about a gear shaft axis. The gear shaft has a first end drivingly engaged to a first accessory and a second end drivingly engaged to a second accessory. The gearbox has a spline made of a polymer material and rotatably coupled to one of the first and second ends of the gear shaft, and to a corresponding one of a first and second accessory shafts of the first and second accessories. The spline is rotatable about the gear shaft axis.

20 Claims, 3 Drawing Sheets

(56) References Cited

U.S. PATENT DOCUMENTS

| | | |
|---|---|---|
| 9,926,849 B2 | 3/2018 | Frost et al. |
| 10,018,087 B2 | 7/2018 | Prunera-Usach et al. |
| 10,072,582 B2 | 9/2018 | Wotzak |
| 10,145,260 B2 | 12/2018 | Armange |
| 10,202,904 B2 | 2/2019 | Duong et al. |
| 10,465,611 B2 | 11/2019 | Durocher et al. |
| 2009/0232640 A1 | 9/2009 | Deperrois et al. |
| 2016/0010561 A1 | 1/2016 | Cloft et al. |
| 2016/0040601 A1 | 2/2016 | Frost |
| 2016/0245183 A1 | 8/2016 | Viel |
| 2017/0218848 A1 | 8/2017 | Alstad |
| 2017/0314474 A1 | 11/2017 | Wotzak |
| 2018/0013552 A1 | 1/2018 | Brandwine et al. |
| 2018/0023482 A1 | 1/2018 | Lefebvre |
| 2018/0073438 A1 | 3/2018 | Durocher et al. |
| 2018/0135522 A1 | 5/2018 | Mitrovic et al. |
| 2018/0274449 A1 | 9/2018 | Anglin et al. |
| 2018/0283464 A1 | 10/2018 | Altamura |
| 2018/0347471 A1 | 12/2018 | Wotzak |
| 2019/0112984 A1 | 4/2019 | Alstad et al. |

FOREIGN PATENT DOCUMENTS

| | | |
|---|---|---|
| EP | 1711700 | 10/2006 |
| EP | 2530282 | 7/2014 |
| EP | 1898072 | 7/2015 |
| EP | 3267013 | 1/2018 |
| EP | 3258084 | 4/2019 |
| EP | 2875227 | 7/2019 |
| EP | 3524527 | 8/2019 |
| EP | 3032072 | 10/2019 |
| EP | 3553294 | 10/2019 |
| FR | 2994585 | 2/2014 |
| FR | 3006733 A1 | 12/2014 |
| RU | 2635227 C1 | 11/2017 |
| WO | 2018178538 | 10/2018 |

\* cited by examiner

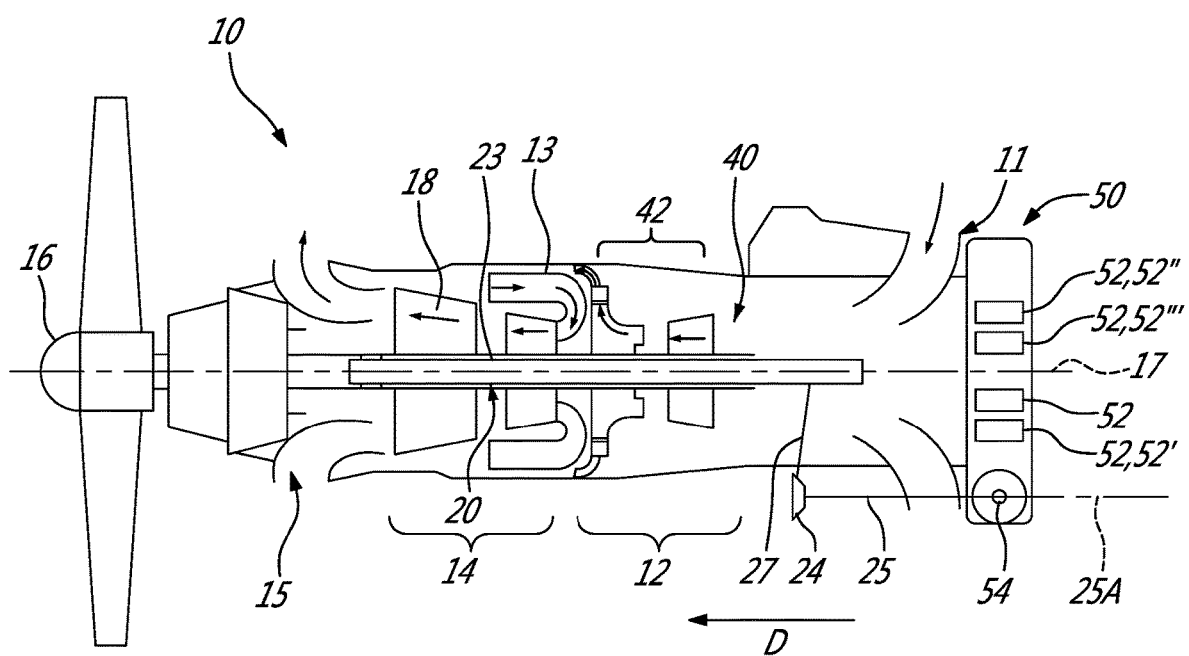
FIG_1

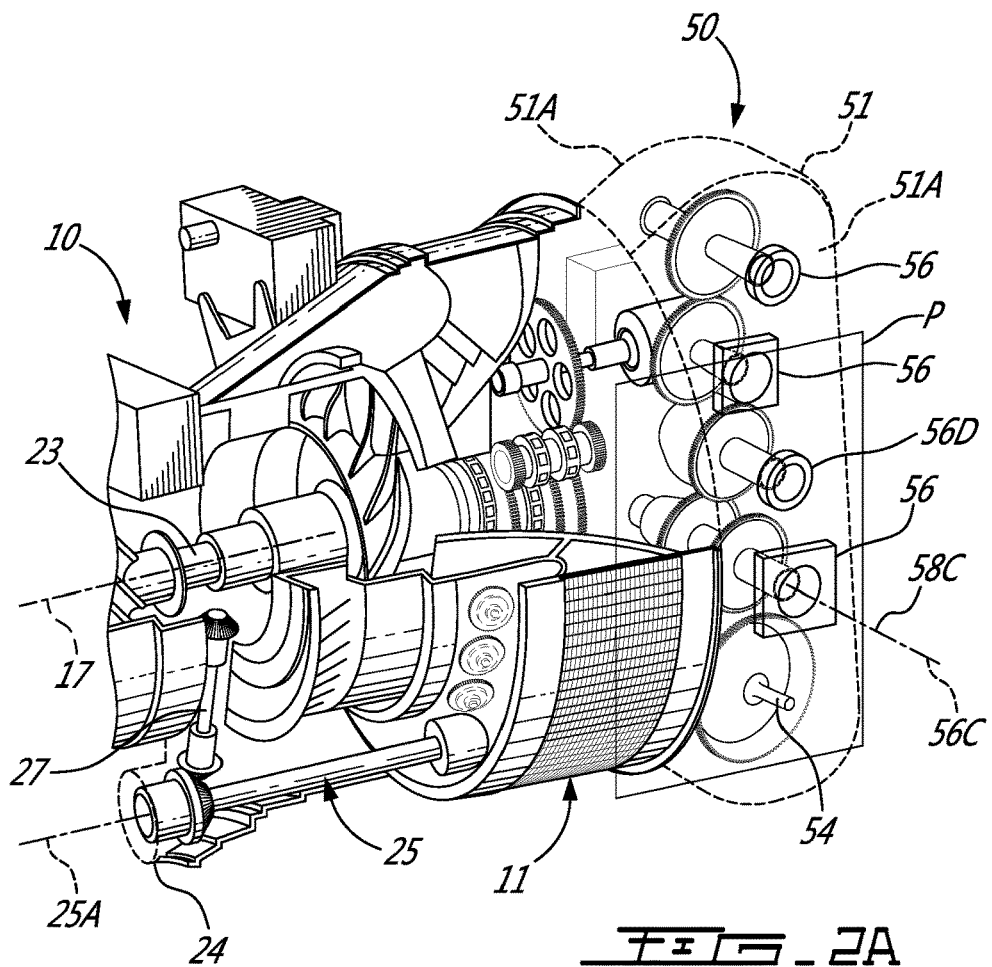
FIG_2A
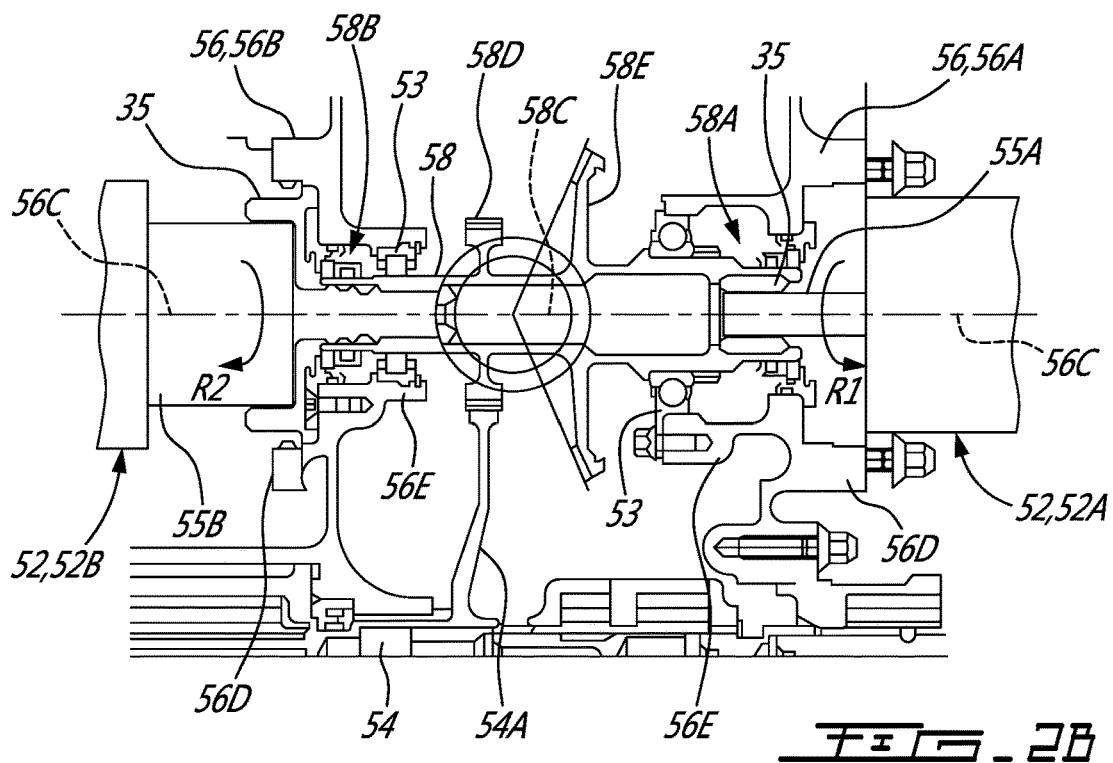
FIG_2B

GAS TURBINE ENGINE WITH ACCESSORY GEARBOX

CROSS-REFERENCE TO RELATED APPLICATIONS

This application is a continuation of patent application Ser. No. 16/278,858 filed Feb. 19, 2019, the entire contents of which are incorporated by reference herein.

TECHNICAL FIELD

The application relates generally to gas turbine engines and, more particularly, to accessory gearboxes of gas turbine engines.

BACKGROUND

The accessory gearbox of gas turbine engines have mechanical drive pads for aircraft accessories. The drive pads are used to securely mount the rotating shaft of each accessory to a shaft of the accessory gearbox. The position and shape of the drive pads must conform to the specifications of the accessory, which often require a minimum pad distance and space for servicing the accessory. The specifications and orientations of some aircraft accessories may increase the volume occupied by the accessory gearbox.

SUMMARY

In one aspect, there is provided a gas turbine engine, comprising: an engine drive shaft; and an accessory gearbox rotatably coupled to the engine drive shaft, the gearbox having a gear shaft rotatable about a gear shaft axis, the gear shaft having a first end drivingly engaged to a first accessory and a second end drivingly engaged to a second accessory.

In another aspect, there is provided an accessory gearbox, comprising: a first mounting pad and a second mounting pad; a gear shaft having a first end mounted to the first mounting pad and a second end mounted to the second mounting pad, the gear shaft rotatable about a gear shaft axis; and a first accessory mounted to the first mounting pad and having a first accessory shaft rotatably coupled to the first end of the gear shaft, and a second accessory mounted to the second mounting pad and having a second accessory shaft rotatably coupled to the second end of the gear shaft.

In another aspect, there is provided a method of driving first and second accessories of a gas turbine engine, the method comprising rotating a single gear shaft extending between the first and second accessories about a gear shaft axis to simultaneously drive the first and second accessories.

DESCRIPTION OF THE DRAWINGS

Reference is now made to the accompanying figures in which:

FIG. 1 is a schematic cross-sectional view of a gas turbine engine;

FIG. 2A is an enlarged perspective view of part of the gas turbine engine of FIG. 1, showing an accessory gearbox;

FIG. 2B is a cross-sectional view of part of the accessory gearbox of FIG. 2A, showing a gear shaft between two mounting pads.

DETAILED DESCRIPTION

Figure 3:
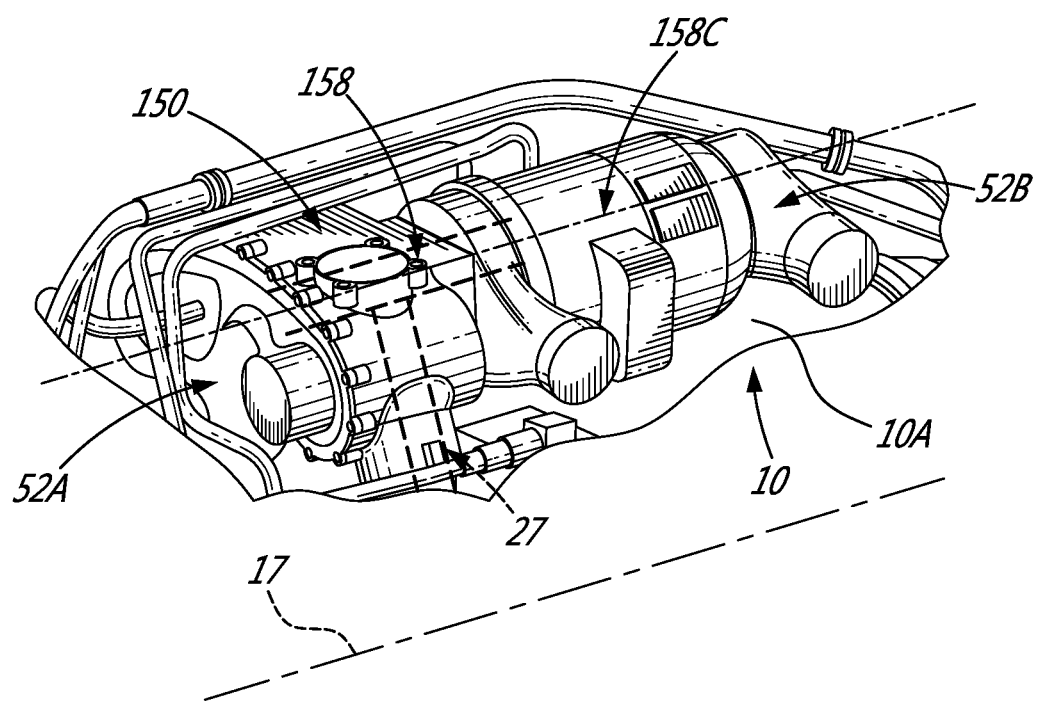
FIG. 3 is an enlarged perspective view of part of the gas turbine engine of FIG. 1, showing another accessory gearbox.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and an exhaust outlet 15 through which the combustion gases exit the gas turbine engine 10. The engine 10 in FIG. 1 includes a propeller 16 which provides thrust for flight and taxiing. The gas turbine engine 10 has a longitudinal center axis 17.

The gas turbine engine 10 (sometimes referred to herein simply as "engine 10") has a central core 18 defining a gas path through which gases flow as depicted by flow arrows in FIG. 1. The exemplified engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16. In alternate embodiments, the engine 10 is a "through-flow" engine 10 where gases flow through the engine 10 from a front end in a direction opposite to the direction D away from the propeller 16. In alternate embodiments, the engine 10 is a turboshaft or turbojet engine.

It will thus be appreciated that the expressions "forward" and "aft" used herein refer to the relative disposition of components of the engine 10, in correspondence to the "forward" and "aft" directions of the engine 10 and an aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the engine 10 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about the center axis 17. However, it is understood that a multi-spool engine could have more than two spools. It is understood that the term "spool" as used herein is intended to broadly refer to drivingly connected turbine and compressor rotors and is, thus, not limited to a compressor and turbine assembly on a single shaft, and includes for example a rotary assembly with multiple shafts geared together. One or both of the LP spool 20 and the HP spool 40 drive an engine drive shaft 23 which rotates about the center axis 17.

Still referring to the embodiment shown in FIG. 1, the engine 10 also includes an accessory gearbox (AGB) 50. The AGB 50 is an arrangement of gearing and shafts that receives a rotational output from the engine drive shaft 23 and in turn drives accessories 52 that contribute to the functionality of the engine 10. FIG. 1 shows the following accessories: a fuel control unit (FCU) 52', a permanent magnet alternator (PMA) 52", and an oil pump 52". It will be appreciated that the AGB 50 can include other accessories 52 as well, such as the following non-limiting examples: an integrated drive generator (IDG), a hydraulic pump, a back-up variable frequency generator (VFG), an air turbine starter, a fuel pump, and a deoiler. During operation of the engine 10, a rotational drive is transmitted to the AGB 50 from the engine drive shaft 23 to thereby drive the accessories 52. In the embodiment shown in FIG. 1, the AGB 50 is mounted to the aft end of the engine 10. The AGB 50 is the most aft component of the engine 10. The AGB 50 is positioned aft of the air inlet 11. Other locations for the AGB 50 are possible, and one such possible alternative location is described in greater detail below.

The accessories 52 of the AGB 50 are driven by an accessory drive shaft 25. The accessory drive shaft 25 is rotatably coupled to the engine drive shaft 23 to transfer a rotational drive from the engine drive shaft 23 to one or more of the accessories 52. Many configurations of this coupling are possible to transfer rotational drive to the accessories 52. In the embodiment shown in FIG. 1, the accessory drive shaft 25 is indirectly coupled to the engine draft shaft 23. The accessory drive shaft 25 is rotatably coupled to a tower shaft 27, via a gear set 24 which may include beveled gears. The tower shaft 27 is directly coupled to the engine drive shaft 23 to be driven thereby. In the embodiment shown in FIG. 1, the accessory drive shaft 25 rotates about an accessory drive shaft axis 25A. The accessory drive shaft axis 25A is parallel to the center axis 17 of the engine 10, about which the engine drive shaft 23 rotates. The accessory drive shaft axis 25A is radially spaced apart from the center axis 17 of the engine 10. The accessory drive shaft 25 is rotatably coupled to an input shaft 54 that is supported by the AGB 50. The input shaft 54 provides the rotational drive to the various accessories 52 of the AGB 50, as described in greater detail below.

The AGB 50 is described in greater detail with reference to FIGS. 2A and 2B. The AGB 50 has a plurality of mounting pads 56. Each mounting pad 56 is attached to, or part of, a static or fixed structure of the AGB 50, such as its casing 51. The mounting pads 56 are static structures. Each mounting pad 56 is used to securely mount one of the accessories 52 to the AGB 50, as described in greater detail below.

The AGB 50 also has a gear shaft 58. Referring to FIG. 2B, the gear shaft 58 is an elongated body which extends between a first end 58A and an opposite second end 58B. The gear shaft 58 is rotatable about a gear shaft axis 58C to drive two accessories 52 disposed at the opposite ends 58A,58B of the gear shaft 58. The gear shaft 58 is mounted between two mounting pads 56. As best shown in FIG. 2B, the first end 58A of the gear shaft 58 is mounted to a first mounting pad 56A, and the second end 58B is mounted to a second mounting pad 56B. The first and second ends 58A,58B of the gear shaft 58 are supported by suitable bearings 53 of the first and second mounting pads 56A,56B. The first and second mounting pads 56A,56B are located at opposite ends 58A,58B of the gear shaft 58 and along the gear shaft axis 58C. The first and second mounting pads 56A,56B are axially spaced apart from each other along the gear shaft axis 58C. The first and second mounting pads 56A,56B have a pad center axis 56C that is coaxial with the gear shaft axis 58C.

Referring to FIG. 2B, the gear shaft 58 is coupled to, and drives, a first accessory 52A and a second accessory 52B. The first and second accessories 52A,52B are the only two accessories 52 in the illustrated embodiment that are rotatably coupled to the gear shaft 58 to be driven thereby. The first accessory 52A is mounted to the first mounting pad 56A and has a first accessory shaft 55A that is rotatably coupled to the first end 58A of the gear shaft 58. An end of the first accessory shaft 55A is axially adjacent to the first end 58A of the gear shaft 58. The first accessory shaft 55A is rotatably coupled to the first end 58A in any suitable manner to transmit a rotational drive from the gear shaft 58 to the first accessory 52A, and vice versa if desired. The first accessory shaft 55A is coaxial with and rotatable about the gear shaft axis 58C. In FIG. 2B, the first accessory shaft 55A is separate from the gear shaft 58.

Still referring to FIG. 2B, the second accessory 52B is mounted to the second mounting pad 56B and has a second accessory shaft 55B that is rotatably coupled to the second end 58B of the gear shaft 58. An end of the second accessory shaft 55B is axially adjacent to the second end 58B of the gear shaft 58. The second accessory shaft 55B is rotatably coupled to the second end 58B in any suitable manner to transmit a rotational drive from the gear shaft 58 to the second accessory 52B, and vice versa if desired. The second accessory shaft 55B is coaxial with and rotatable about the gear shaft axis 58C. In FIG. 2B, the second accessory shaft 55B is separate from the gear shaft 58. In FIG. 2B, the gear shaft 58 is the only rotatable shaft mounted to the first and second accessories 52A,52B, and is the only shaft providing a rotational drive to the first and second accessories 52A, 52B.

The first and second mounting pads 56A,56B have any suitable shape to rotatably support the gear shaft 58, and the first and second accessory shafts 55A,55B. An example of the structure of the first and second mounting pads 56A,56B is provided in FIGS. 2A and 2B. Each of the first and second mounting pads 56A,56B have a flange 56D protruding from an adjacent surface of the casing 51 of the AGB 50. The flanges 56D form part of the outer surface of the casing 51. Referring to FIG. 2B, each of the first and second mounting pads 56A,56B has a housing portion 56E being hollow and extending inwardly into the casing from the flange 56D. The housing portion 56E defines the pad center axis 56C. The housing portions 56E are shaped and sized to receive at least part of the first and second ends 58A.58B of the gear shaft 58, and/or part of the first and second accessory shafts 55A,55B. Segments of the housing portions 56E are mounted to other static structure of the casing 51 or AGB 50. The flanges 56D may be equipped with holes and corresponding fasteners to mount the first and second accessories 52A,52B thereto. The first and second mounting pads 56A, 56B therefore help to securely mount the first and second accessory shafts 55A,55B to the gear shaft 58 of the AGB 50. Other structures and shapes for the mounting pads 56 are possible.

In the illustrated embodiment, the first and second mounting pads 56A,56B are positioned on opposed lateral sides of the casing 51 of the AGB 50. Referring to FIG. 2A, the casing 51 has side walls 51A (one of the side walls 51A being hidden from view) which are spaced apart from one another and define a width of the casing 51, and thus a width of the AGB 50. In FIG. 2A, the width of the casing 51 may be less than a diameter of the air inlet 11. The first and second mounting pads 56A,56B are positioned on the side walls 51A and are thus spaced apart across the width of the AGB 50. Referring to FIG. 2A, the pad center axis 56C is normal to a plane P in which the center axis 17 of the engine 10 lies. The plane P is parallel to the center axis 17. The first and second mounting pads 56A,56B are laterally offset from one another across the width of the AGB 50. The first and second accessories 52A,52B are also thus laterally offset from one another across the width of the AGB 50. The first and second mounting pads 56A,56B are oriented towards the sides of the engine 10, in contrast to the drive pads of some conventional AGBs which have a forward or aft orientation (i.e. an orientation parallel to the engine center axis).

The AGB 50 therefore has an arrangement of the mounting pads 56A,56B that allows a single gear shaft 58 to simultaneously drive two accessories 52A,5B positioned at the opposite ends 58A,58B of the gear shaft 58. This configuration of the gear shaft 58 and of the first and second accessories 52A,52B helps to provide a compact drive pad arrangement for the AGB 50, which may thus reduce the volume of the engine 10 occupied by the AGB 50.

Referring to FIG. 2B, the gear shaft 58 is rotatably coupled to the input shaft 54 of the AGB 50. In FIG. 2B, the gear shaft 58 is therefore indirectly rotatably coupled to the engine drive shaft 23. In an alternate embodiment, the gear shaft 58 is directly rotatably coupled to the drive shaft 23. In an alternate embodiment, the gear shaft 58 is directly rotatably coupled to the accessory drive shaft 25. The input shaft 54 has an output gear 54A that meshes with an input gear 58D of the gear shaft 58. Rotational drive from the input shaft 54 may therefore be transmitted to the gear shaft 58, and thus to the first and second accessories 52A,52B. The gear shaft 58 has an output gear 58E which may be used to drive other components of the AGB 50, or be driven thereby.

As shown in FIG. 2A, the tower shaft 27 and the gear set 24 are axially spaced apart from the gear shaft 58 along a direction of the center axis 17, and along a direction of the accessory drive shaft axis 25A of the accessory drive shaft 25. The accessory drive shaft axis 25A is transverse to the gear shaft axis 58C. In the embodiment shown in FIG. 2B, the first and second ends 58A,58B of the gear shaft 58 are hollow. The gear shaft 58 is hollow along substantially all of its length along the gear shaft axis 58C.

The rotational axes of the first and second accessories 52A,52B and of the gear shaft 58 have a different orientation than that of the center axis 17 of the engine 10. Referring to FIG. 2A, the gear shaft axis 58C is transverse to the center axis 17. The gear shaft axis 58C is normal to a first plane, and the center axis 17 is normal to a second plane. The first and second planes are intersecting. The first and second planes are transverse to one another. The first and second planes are not parallel. The orientation of the first and second accessories 52A,52B is thus transverse to the center axis 17, which may help with reducing the volume occupied by the AGB 50 when the AGB 50 is positioned at the aft end of the engine 10, as shown in FIG. 2A. In this manner, the axial length of the AGB 50 and its arrangement of accessories 52 may be reduced compared to conventional AGBs which have axially-oriented accessories. The accessories which have a forward/aft orientation (i.e. an orientation parallel to the engine center axis) and which are longitudinal offset from each other across the length of some conventional AGBs may contribute to the overall length of the engine when the AGB is positioned at an aft end thereof.

Referring to FIG. 2B, the first accessory shaft 55A is rotatable at a first rotational speed and the second accessory shaft 55B is rotatable at a second rotational speed. The first and second rotational speeds are the same. The gear shaft 58 is thus operable to drive the first and second accessory shafts 55A,55B at the same rotational speed of the gear shaft 58.

In an alternate embodiment, the gear shaft 58 drives the first and second accessory shafts 55A,55B at different rotational speeds, where one or both of the first and second accessories 52A,52B employs suitable gear reduction. The first accessory shaft 55A is rotatable in a first rotational direction R1 and the second accessory shaft 55B is rotatable in a second rotational direction R2 opposite to the first rotational direction R1. Since both the first and second accessory shafts 55A,55B are directly driven by the same gear shaft 58 in the depicted embodiment, the first and second accessory shafts 55A,55B turn in opposite directions. In an alternate embodiment, the first and second accessory shaft 55A,55B turn in the same direction, where one or both of the first and second accessories 52A,52B employs suitable gearing to achieve this.

In the depicted embodiment, the first accessory 52A is operational between a range of rotational speeds referred to herein as a first rotational speed range, and the second accessory 52B is operational between a range of rotational speeds referred to herein as a second rotational speed range. The first and second rotational speed ranges include upper and lower limit values for rotational speed at which the accessory 52A,52B is designed to operate at. The first and second rotational speeds are situated between the upper and lower limit values of both the first and second rotational speed ranges. In the depicted embodiment, there is overlap between the first rotational speed range of the first accessory 52A and the second rotational speed range of the second accessory 52B. This allows two different accessories, with two different rotational speed ranges, to be driven by the same gear shaft 58. For example, the first and second rotational speeds may be closer to the upper limit of the first rotational speed range, and the first and second rotational speeds may be closer to the lower limit of the second rotational speed range. Alternatively, the first and second rotational speeds may be closer to the lower limit of the first rotational speed range, and the first and second rotational speeds may be closer to the upper limit of the second rotational speed range. In the embodiment of FIG. 2B, the first accessory 52A is a fuel control unit (FCU) and the second accessory 52B is a starter/generator. The FCU may have a first rotational speed range of for example 6,000 to 11,000 RPM, whereas the starter/generator may have a second rotational speed range of for example 9,000 to 14,000 RPM. If the gear shaft 58 speed, and thus the first and second rotational speeds, are 10,000 RPM for example, then the first and second rotational speeds are closer to the upper limit of the first rotational speed range, and closer to the lower limit of the second rotational speed range. Thus the first accessory 52A driven by the gear shaft 58 may be selected to accommodate the best compromised operating speed for the second accessory 52B driven by the same gear shaft 58, and vice versa.

The spacing of the first and second accessories 52A,52B across the gear shaft 58 may be suited for having "dry" accessories 52 on one of the first and second ends 58A,58B of the gear shaft 58, and "wet" accessories 52 on the other of the first and second ends 58A,58B. Dry accessories 52 may be considered to be those which remain free of fluid during operation, such as accessories 52 using or producing electricity (e.g. the starter/generator, the PMA 52", the IDG, the back-up VFG, the air turbine starter, etc.). Wet accessories 52 may be considered to be those which employ or convey fluid during operation (e.g. the FCU, the oil pump 52''', the hydraulic pump, the fuel pump, the deoiler, etc.). The spacing of the accessories 52 on opposite ends 58A,58B of the gear shaft 58 may help to avoid potential leaks from the wet accessories 52 disturbing the operation of the dry accessories 52. In FIG. 2B, the first accessory 52A is a fluid or wet accessory such as the FCU, the oil pump 52''', the hydraulic pump, the fuel pump, the deoiler, etc., and the second accessory 52B is an electrical or dry accessory such as the starter/generator, the PMA 52'', the IDG, the back-up VFG, the air turbine starter, etc.

Referring to FIG. 2B, the AGB 50 has one or more splines 35 rotatably coupled to one of the first and second ends 58A,58B of the gear shaft 58, and to a corresponding one of the first and second accessory shafts 55A,55B. The spline 35 is thus a coupling between the gear shaft 58 and one or both of the first and accessory shafts 55A,55B. The spline 35 is rotatable about the gear shaft axis 58C. In the embodiment show in FIG. 2B, one spline 35 is coupled to the first accessory shaft 55A and to the first end 58A of the gear shaft 58, and another spline 35 is coupled to the second accessory shaft 55B and to the second end 58B of the gear shaft 58. The spline 35 is made in whole or in part from a polymer material, such as plastic or polyimide, to name but a few examples. The spline 35 is an adapter designed to experience wear, and can be easily replaced. In a conventional AGB, the connection of the shaft to an accessory shaft must be lubricated with oil, but this may be difficult to do in the single gear shaft 58 configuration disclosed herein because the first and second accessories 52A,52B are positioned at, and mounted to, opposite ends 58A,58B of the gear shaft 58. The spline 35 may not need to be lubricated.

In the embodiment shown in FIG. 3, the AGB 150 is mounted on top of a casing 10A of the engine 10. The AGB 150 may also be mounted to a side of the casing 10A of the engine 10, or at any desirable angular position. In such an embodiment, the gear shaft axis 158C may be parallel to the center axis 17 of the gas turbine engine 10. The rotational axes of the first and second accessories 52A,52B and of the gear shaft 158 thus have the same orientation as that of the center axis 17 of the engine 10. Stated differently, the gear shaft axis 158C in the depicted embodiment is normal to a first plane, and the center axis 17 is normal to a second plane. The first and second planes are parallel. The first and second planes are not transverse to one another. The gear shaft 158 of the AGB 150 may be rotatably coupled to the radial tower shaft 27, where the tower shaft 27 is directly coupled to the engine drive shaft 23 to be driven thereby. The gearbox 150 in the depicted embodiment may be mounted adjacent to a core of the engine 10 and enclosed by a core nacelle surrounding the core of the engine 10.

Referring to FIGS. 2A and 2B, a method of driving the first and second accessories 52A,52B is also disclosed. The method includes rotating the single gear shaft 58 extending between the first and second accessories 52A,52B about the gear shaft axis 58C to simultaneously drive the first and second accessories 52A,52B.

The above description is meant to be exemplary only, and one skilled in the art will recognize that changes may be made to the embodiments described without departing from the scope of the invention disclosed. For example, although the AGB 50,150 is described with one gear shaft 58,158, it will be appreciated that the AGB 50,150 may have more than one gear shaft 58,158 arranged parallel to one another and extending between axially-spaced apart mounting pads 56. Still other modifications which fall within the scope of the present invention will be apparent to those skilled in the art, in light of a review of this disclosure, and such modifications are intended to fall within the appended claims.

The invention claimed is:

1. A gas turbine engine, comprising:
an engine drive shaft; and
an accessory gearbox rotatably coupled to the engine drive shaft, the gearbox having a gear shaft rotatable about a gear shaft axis, the gear shaft having a first end drivingly engaged to a first accessory and a second end drivingly engaged to a second accessory, the gearbox having a spline made of a polymer material and rotatably coupled to one of the first end and the second end of the gear shaft, and to a corresponding one of a first accessory shaft and a second accessory shaft of the first accessory and the second accessory, respectively, the spline rotatable about the gear shaft axis.

2. The gas turbine engine of claim 1, wherein the gear shaft axis is transverse to a center axis of the gas turbine engine.

3. The gas turbine engine of claim 2, wherein the accessory gearbox is disposed at an aft end of the gas turbine engine.

4. The gas turbine engine of claim 1, wherein the accessory gearbox is disposed on top of a casing of the gas turbine engine, or along a side of the casing.

5. The gas turbine engine of claim 4, wherein the gear shaft axis is parallel to a center axis of the gas turbine engine.

6. The gas turbine engine of claim 1, wherein the accessory gearbox has a first mounting pad and a second mounting pad spaced apart across a width of the accessory gearbox.

7. The gas turbine engine of claim 1, wherein the first accessory shaft is rotatable at a first rotational speed and the second accessory shaft is rotatable at a second rotational speed, the first rotation speed and the second rotational speed being the same.

8. The gas turbine engine of claim 7, wherein the first accessory has a first rotational speed range and the second accessory has a second rotational speed range, the first rotational speed and the second rotational speed being closer to one of an upper limit and a lower limit of the first rotational speed range, and the first rotational speed and the second rotational speed being closer to the other one of an upper limit and a lower limit of the second rotational speed range.

9. The gas turbine engine of claim 1, wherein the first accessory shaft is rotatable in a first rotational direction and the second accessory shaft is rotatable in a second rotational direction opposite to the first rotational direction.

10. The gas turbine engine of claim 1, wherein the first accessory is a fuel control unit (FCU) and the second accessory is a starter/generator.

11. The gas turbine engine of claim 1, wherein the first accessory is a fluid accessory and the second accessory is an electrical accessory.

12. An accessory gearbox, comprising:
a first mounting pad and a second mounting pad;
a gear shaft having a first end mounted to the first mounting pad and a second end mounted to the second mounting pad, the gear shaft rotatable about a gear shaft axis;
a first accessory mounted to the first mounting pad and having a first accessory shaft rotatably coupled to the first end of the gear shaft, and a second accessory mounted to the second mounting pad and having a second accessory shaft rotatably coupled to the second end of the gear shaft; and
a spline made of a polymer material and rotatably coupled to one of the first end and the second end of the gear shaft, and to a corresponding one of the first accessory shaft and the second accessory shaft, the spline rotatable about the gear shaft axis.

13. The accessory gearbox of claim 12, wherein the first accessory shaft is rotatable at a first rotational speed and the second accessory shaft is rotatable at a second rotational speed, the first rotational speed and the second rotational speed being the same.

14. The accessory gearbox of claim 13, wherein the first accessory has a first rotational speed range and the second accessory has a second rotational speed range, the first rotational speed and the second rotational speed being closer to one of an upper limit and a lower limit of the first rotational speed range, and the first rotational speed and the second rotational speed being closer to the other one of an upper limit and a lower limit of the second rotational speed range.

15. The accessory gearbox of claim 12, wherein the first accessory shaft is rotatable in a first rotational direction and the second accessory shaft is rotatable in a second rotational direction opposite to the first rotational direction.

16. A method of driving a first accessory and a second accessory of a gas turbine engine, the method comprising rotating a single gear shaft extending between the first accessory and the second accessory about a gear shaft axis to simultaneously drive the first accessory and the second accessory, and to drive a polymer spline coupling an end of the single gear shaft to one of the first accessory and the second accessory.

17. The method of claim 16, wherein rotating the single gear shaft includes rotating the single gear shaft to simultaneously drive the first accessory at a first rotational speed and the second accessory at a second rotational speed, the first rotational speed and the second rotational speed being the same.

18. The method of claim 17, wherein the first rotational speed and the second rotational speed are closer to one of an upper limit and a lower limit of a first rotational speed range of the first accessory, and the first rotational speed and the second rotational speed are closer to the other one of an upper limit and a lower limit of a second rotational speed range of the second accessory.

19. The method of claim 16, wherein rotating the single gear shaft includes rotating the single gear shaft to simultaneously drive the first accessory in a first rotational direction and the second accessory in a second rotational direction opposite to the first rotational direction.

20. The method of claim 16, wherein rotating the single gear shaft includes rotating the single gear shaft to simultaneously drive the first accessory being a fluid accessory and the second accessory being an electrical accessory.

\* \* \* \* \*